Feb. 2, 1954     C. F. ROGERS     2,667,959
CONVEYING AND POSITIONING MECHANISM
Filed Sept. 7, 1951
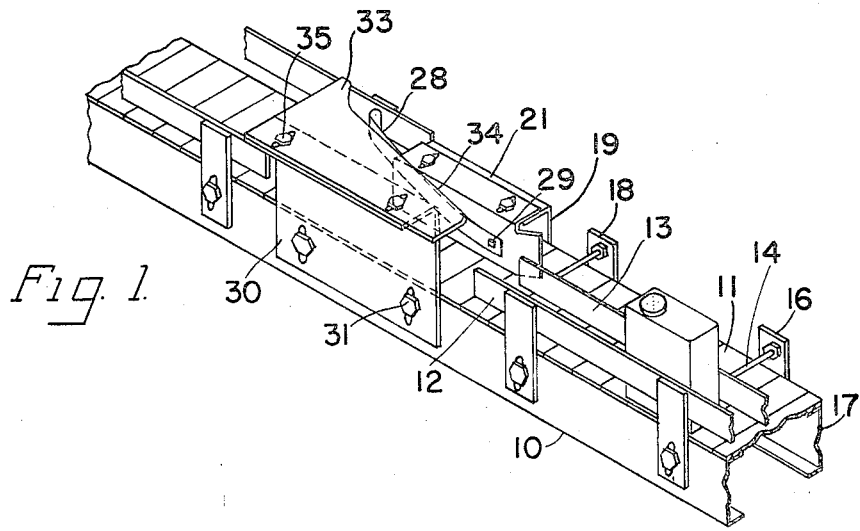
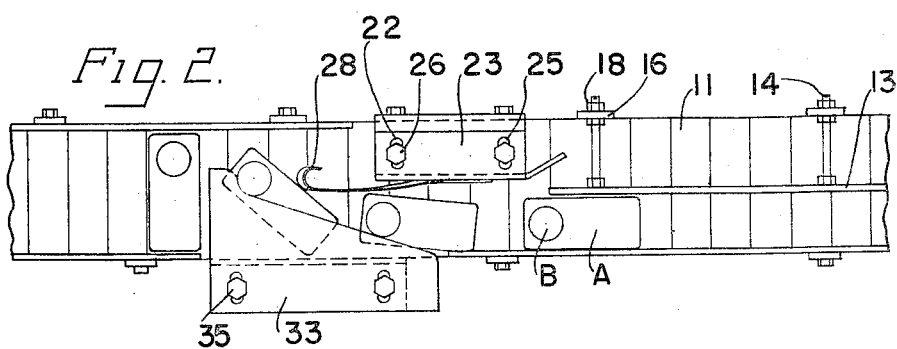
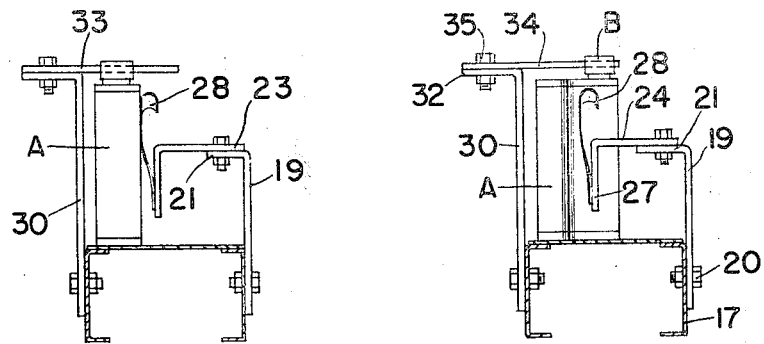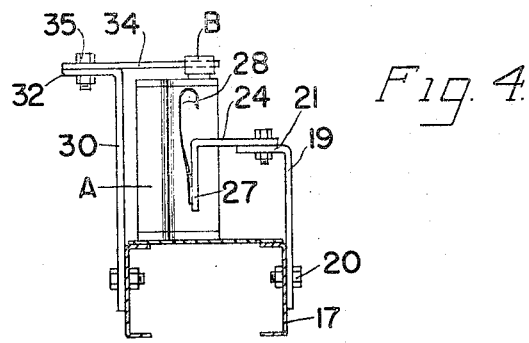
INVENTOR
CHARLES F. ROGERS
BY *Allen C Buhler*
ATTORNEY

Patented Feb. 2, 1954

2,667,959

UNITED STATES PATENT OFFICE 2,667,959

CONVEYING AND POSITIONING MECHANISM

Charles F. Rogers, Racine, Wis., assignor to S. C. Johnson & Son, Inc., Racine, Wis.

Application September 7, 1951, Serial No. 245,569

4 Claims. (Cl. 198—33)

This invention relates to a conveying and positioning mechanism for containers. More particularly, it relates to a conveying and positioning mechanism for oblong-shaped containers having a spout or nozzle projecting from the top thereof.

After being filled, oblong-shaped containers are shunted from the filling mechanism, moving toward the packaging operation with the panel or side, which defines the thickness of the container, as the leading edge. In certain packaging operations it is desirable to have the dimensionally larger side, that defining the length of the can, to serve as the leading edge and be thus conveyed to the packaging operation for placement in a suitable carton for shipment.

Devices have been constructed for turning containers, while moving on a conveyor, so as to change the leading edge of the container, but such devices have been most elaborate, expensive to install, and in addition, require the conveyor to angle off a straight or direct course, deviating its direction in order to effect the orientation. Then too, after the container is turned, since the leading edge is dimensionally larger than before the turning operation, a conveyor with correspondingly larger width has been requisite to move the container the remaining distance to the packaging operation.

It is therefore the principal object of my invention to provide a device for automatically turning oblong-shaped containers, as they progress on a conveyor, so as to change the leading edge.

Another object of my invention is to provide a device capable of the function described above, yet which does not require a change in width or deviation in direction of the conveyor after the turning operation.

A further object of my invention is to provide a device capable of the function described above, which may be inexpensively constructed and installed without any difficulty.

Another object of my invention is to provide this type of device which may be expediently adapted for use in any conventional conveyor system.

Other objects of the present invention will become apparent in the course of the following specification.

In the drawings:

Figure 1 is a perspective view of the conveying and positioning mechanism.

Figure 2 is a top plan view of the device shown in Figure 1.

Figure 3 is an end view of the device shown in Figure 1, seen from the direction of travel along the conveyor causeway, showing a container prior to turning.

Figure 4 is an end view of the device shown in Figure 1, seen from the direction of travel along the conveyor causeway, showing a container in the act of turning.

Similar numerals refer to similar parts throughout the several views.

Referring especially to Figure 1, it will be seen that an endless platform chain conveyor 10 is constructed with a series of flat metal plates 11.

Defining one margin of the conveyor is a permanently positioned guard rail 12, while an adjustable guard rail 13 guides the movement of the containers from the other side of the conveyor. This rail 13 is constructed to be adjusted to the position desired, and this obviously can be achieved by several means, as for example, that shown in the drawings. A pair of bolts 14 are soldered to the rail 13 and project through threaded opening 15 in an anchor plate 16, which is affixed to the side of the conveyor structure 17. Nuts 18 are located on both sides of the anchor plate 16, holding the adjustable rail 13 rigid.

An inturning bracket 19, positioned on the same side of the conveyor as the adjustable rail 13, rises perpendicular to the conveyor, being attached to the conveyor structure 17 by means of a nut and bolt arrangement 20. Fashioned in the horizontal overhanging portion 21 of the bracket 19 are adjustment slots 22. Carried by the bracket 19 is an attachment 23 which is bent at an angle of substantially 90°, so that the horizontal surface 24 is superimposed upon the overhanging portion 21 of the bracket 19. In this superimposed position, the slots 25, fashioned in the horizontal surface 24, coincide with the adjustment slots 22 of the overhanging portion 21. Bolts 26 extending through the slots hold the pieces secure, and upon loosening, the attachment 23 may be adjusted horizontally.

Affixed to the attachment's vertical surface 27 is a retaining media 28 constructed of resilient material, as for example, a strip of sheet steel. This retaining media 28 extends diagonally upwards to form an acute angle with a plane parallel to the conveyor 10 and the angle may be made more or less acute by adjustment of the bolt and slot arrangement 29. However, it is mandatory, as will be later appreciated, that the retaining media 28 be extended from at least such an angle that contact is made with it upon the upper one-half of the containers A.

An outturning bracket 30 is affixed to the conveyor structure 17 on the side opposite the inturning bracket 19. A bolt and slot arrangement 31 holds the bracket 30 secure, but upon disengagement allows it to be graduated at a variance in height.

Superimposed upon the outturning or horizontal portion 32 of the bracket 30 is the deflector 33. The contacting margin 34 is crooked and the depth of its curve is adaptable to the particular operation involved by loosening and resetting the bolts 35. It is necessary that the outturning bracket 30 be raised to such a height so as to cause the deflector's contacting margin 34 to contact the caps B of the containers A.

In operation, the containers are filled and capped and after leaving the capping mechanism, move longitudinally, so that the width of each container defines the leading edge. The adjustable guard rail 13 is set so as to place a distance, slightly greater than the width of the container, between it and the guard rail 12. The attachment 23 and retaining media 28 is similarly adjusted. When the container reaches the deflector 33, the cap B strikes the margin 34, while the retaining media exerts a pressure on the upper portion of the container to retain the container cap against the deflector margin 34. The combination of this force exerted by the retaining media 28, together with the forward momentum of the conveyor, causes the cap to ride along the margin 34. As the container begins to turn, the pressure exerted by the retaining media 28 impinges against the back portion of the container, aiding it in swinging. A quarter turn of the can is thus effected and it now progresses to the packaging operation with the length as the leading edge.

It will be noted that the same conveyor, with no change in breadth or deviation in direction is utilized throughout the entire operation. This is an important factor, not only in that a less complex and expensive mechanism is thereby achieved, but a considerable amount of space is saved.

It is necessary that the retaining media contact the container on the upper one-half of the side which defines the depth of the can, since contact below that portion may cause the container to tip.

It should be appreciated that the device, above described, may be employed with any oblong-shaped container, provided a spout or a cap projects from the top thereof.

Thus, in accordance with my invention, I have provided a simple and yet most efficient means of orienting or turning containers on a moving conveyor so that containers progressing along the conveyor assume different leading edges. Furthermore, it will now be seen that this type of mechanism may be installed in any endless conveyor system and that the same conveyor may be used both prior and after the turning operation.

I wish it understood that I do not desire to be limited to the exact details of construction shown and described, for obvious modifications will occur to a person skilled in the art.

I claim:

1. A conveying and positioning mechanism for oblong-shaped containers having elements projecting from the tops thereof comprising an endless platform conveyor for carrying the containers, means for rotating said containers on said conveyor comprising a deflector and a resilient retaining means, said deflector being disposed horizontally over said conveyor in the same plane as that in which the projecting elements of said containers move, an engaging edge on said deflector extending obliquely over said conveyor from one side thereof whereby said projecting elements are directed toward the opposite side of said conveyor, said resilient retaining means lying above said conveyor in a position generally opposite the deflector and sufficiently high to contact the upper half of said containers, said retaining means being adapted to hold the containers with their projecting elements in contact with the deflector and to rotate the same about their projecting elements as the latter move along a line defined by the engaging edge of said deflector.

2. The conveying and positioning mechanism of claim 1 having an adjustable guide rail extending from the rotating means toward the charging end of the conveyor whereby said containers are maintained on the same side of said conveyor as that from which the deflector extends.

3. The conveying and positioning mechanism of claim 2 wherein said guide rail is manually adjustable, and wherein said resilient retaining means is horizontally and vertically adjustable.

4. The conveying and positioning mechanism of claim 3 wherein the engaging edge of the deflector defines curve concave with reference to the charging end of said conveyor and wherein said curve is manually adjustable.

CHARLES F. ROGERS.

References Cited in the file of this patent

FOREIGN PATENTS

| Number | Country | Date |
|---|---|---|
| 655,271 | Germany | Jan. 12, 1938 |